United States Patent
Parchami et al.

(10) Patent No.: US 11,003,182 B2
(45) Date of Patent: May 11, 2021

(54) VEHICLE MONITORING AND CONTROL INFRASTRUCTURE

(71) Applicant: Ford Global Technologies, LLC, Dearborn, MI (US)

(72) Inventors: Mostafa Parchami, Dearborn, MI (US); Mahrdad Damsaz, Dexter, MI (US); Hamed Babazadehrokni, Livonia, MI (US); Krithika Swaminathan, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 175 days.

(21) Appl. No.: 16/239,810

(22) Filed: Jan. 4, 2019

(65) Prior Publication Data
US 2020/0218259 A1   Jul. 9, 2020

(51) Int. Cl.
*G05D 1/00*      (2006.01)
*G07C 5/08*      (2006.01)
*B60W 30/085*    (2012.01)
*B60W 30/095*    (2012.01)
*B60W 30/16*     (2020.01)

(52) U.S. Cl.
CPC ......... *G05D 1/0072* (2013.01); *B60W 30/085* (2013.01); *B60W 30/0956* (2013.01); *B60W 30/16* (2013.01); *G05D 1/0088* (2013.01); *G07C 5/0808* (2013.01); *G05D 2201/0213* (2013.01)

(58) Field of Classification Search
CPC .................................................. G05D 1/0072
See application file for complete search history.

(56) References Cited

U.S. PATENT DOCUMENTS

| | | | |
|---|---|---|---|
| 5,925,080 A * | 7/1999 | Shimbara | G05D 1/0244 701/23 |
| 8,849,494 B1 * | 9/2014 | Herbach | B60W 60/0015 701/24 |
| 9,499,139 B2 | 11/2016 | Koravadi | |
| 9,870,003 B2 | 1/2018 | Neff | |
| 2016/0378121 A1 * | 12/2016 | Shue | G08G 5/025 701/7 |
| 2017/0023945 A1 | 1/2017 | Cavalcanti et al. | |
| 2017/0229025 A1 * | 8/2017 | Klinger | H04B 7/18506 |
| 2017/0336787 A1 | 11/2017 | Pichlmaier et al. | |
| 2017/0344023 A1 * | 11/2017 | Laubinger | |
| 2018/0005407 A1 * | 1/2018 | Browning | G05D 1/0246 |
| 2018/0204398 A1 | 7/2018 | Smith | |
| 2019/0033862 A1 * | 1/2019 | Groden | G05D 1/0072 |
| 2019/0113916 A1 * | 4/2019 | Guo | B60W 60/0015 |
| 2019/0220011 A1 * | 7/2019 | Della Penna | G08G 1/0133 |
| 2019/0329898 A1 * | 10/2019 | Jenkins | B64C 29/0025 |
| 2020/0218259 A1 * | 7/2020 | Parchami | G07C 5/0808 |

FOREIGN PATENT DOCUMENTS

WO   2015155133 A1   10/2015

* cited by examiner

*Primary Examiner* — Jean Paul Cass
(74) *Attorney, Agent, or Firm* — Frank A. MacKenzie; Bejin Bieneman PLC

(57) ABSTRACT

A planned path is received from a vehicle along with a status of a perception subsystem in the vehicle. A remedial action is initiated determining that the status of the perception subsystem is healthy and the planned path deviates by more than a threshold from a detected path.

18 Claims, 7 Drawing Sheets

VEHICLE MONITORING AND CONTROL INFRASTRUCTURE

BACKGROUND

Autonomous or semi-autonomous vehicles include sensors to detect a surrounding environment. Based on data from the sensors, a vehicle computer can be programmed to plan a path for the vehicle to follow. Further, the computer can instruct actuators and/or vehicle components, e.g., braking, steering, propulsion, etc., to actuate to execute the planned path. However, even if vehicle sensors are performing to specifications, i.e., without fault, a vehicle can deviate from a planned path due to faults or failures in actuators and/or components. However, a vehicle may not be able to self-diagnose or detect such deviation from a planned path.

DETAILED DESCRIPTION

Introduction

A system comprises a computer including a processor and a memory, the memory storing instructions executable by the processor to receive from a vehicle a planned path and a status of a perception subsystem in the vehicle; and initiate a remedial action upon determining that the status of the perception subsystem is healthy and the planned path deviates by more than a threshold from a detected path. The remedial action can include a command to the vehicle to stop. The perception system can include a vehicle sensor. The instructions can further include instructions to determine the detected path based on data from an infrastructure sensor and data provided by a second vehicle. The threshold can be a distance. The distance can be dependent on velocity. The threshold can be an absence of the vehicle from a square in a grid that includes the planned path. The instructions can further include instructions to determine the detected path based on data collected by a sensor at a first time and data collected by the sensor at a second time. The instructions can further include instructions to determine that the planned path deviates by more than the threshold from the detected path based on data from a second vehicle and data from a non-moving infrastructure element. The system can further comprise a non-moving infrastructure element, wherein the computer is mounted to the infrastructure element.

A method comprises receiving from a vehicle a planned path and a status of a perception subsystem in the vehicle; and initiating a remedial action upon determining that the status of the perception subsystem is healthy and the planned path deviates by more than a threshold from a detected path. The remedial action can include a command to the vehicle to stop. The perception system can include a vehicle sensor. The method can further comprise determining the detected path based on data from an infrastructure sensor and data provided by a second vehicle. The threshold can be a distance. The distance can be dependent on velocity. The threshold can be an absence of the vehicle from a square in a grid that includes the planned path. The method can further comprise determining the detected path based on data collected by a sensor at a first time and data collected by the sensor at a second time. The method can further comprise determining that the planned path deviates by more than the threshold from the detected path based on data from a second vehicle and data from a non-moving infrastructure element. The method can be executed by, according to instructions stored in, a computer mounted to an infrastructure element.

Exemplary System Elements

Figure 1:
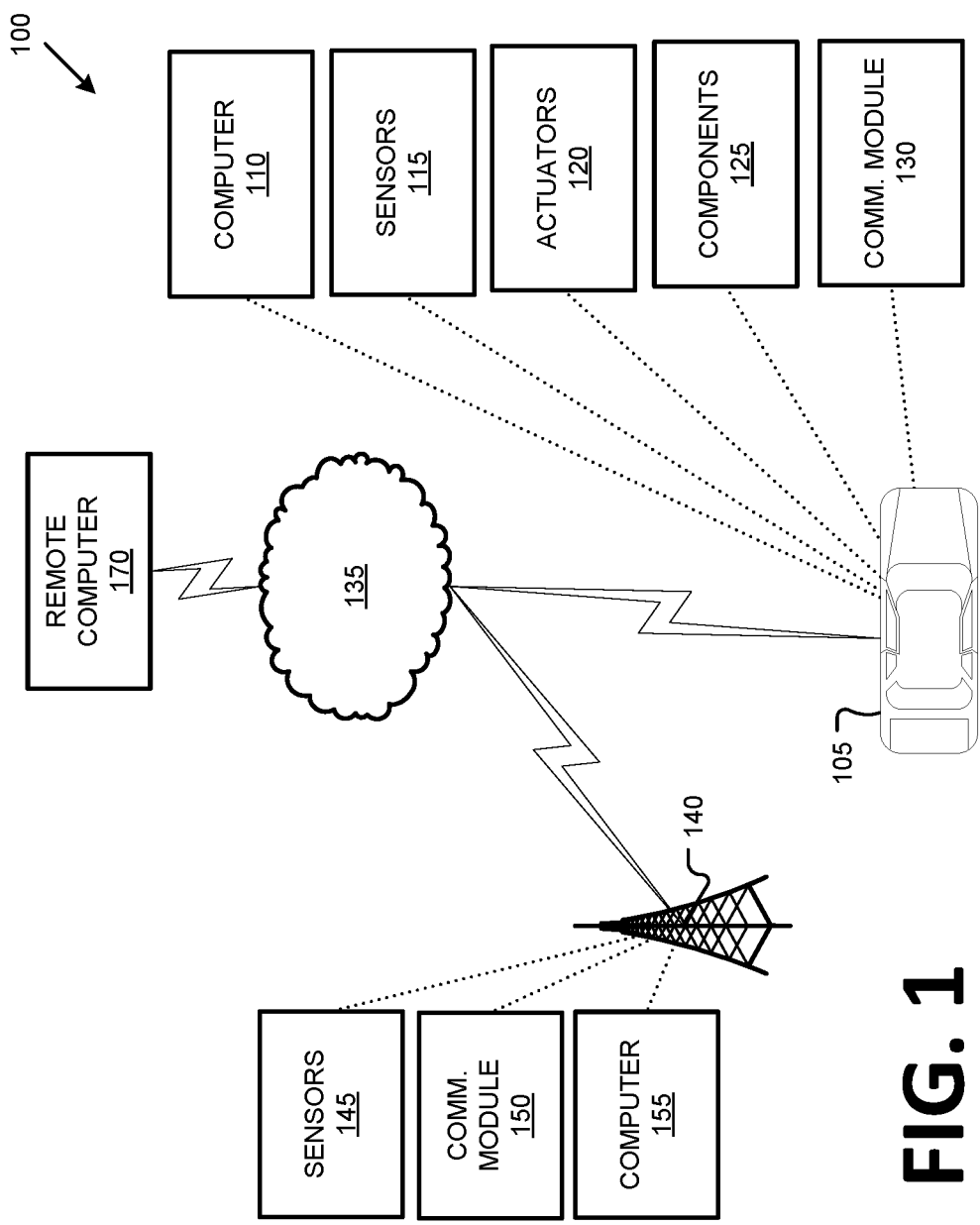
FIG. 1 is a diagram illustrating an example infrastructure communications and control system.

FIG. 1 is a block diagram of an example vehicle monitoring and control infrastructure system 100. An infrastructure element 140 can include a computer 155 programmed to receive and process data from one or more infrastructure element 140 sensors 145. Further, the infrastructure element 140 can include a communications module 150 for vehicle-to-infrastructure (V2I or V2X) communications that can allow an infrastructure element installed proximate to a road to provide data to, and receive data from, vehicles 105 in an area proximate to the infrastructure element.

A vehicle 105 is typically a powered land vehicle such as a car, truck, motorcycle, etc. A vehicle 105 can include a vehicle computer 110, sensors 115, actuators 120 to actuate various vehicle components 125, and a vehicle communications module 130. Via a network 135, the communications module 130 allows the vehicle computer 110 to communicate with one or more infrastructure elements 140 and a central server 170.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or the vehicle 105, in some examples, additionally has capability for operation in a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate components 125 including one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, a human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be detected by sensing physical phenomena (e.g., light or other electromagnetic waves, or sound, etc.), e.g., phenomena detectable by sensors 115. An object can be moving (speed≠0) or temporarily or permanently stationary (speed=0). Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2I) wireless communications to another vehicle, to an infrastructure element 140 (typically via direct radio frequency communications) and/or (typically via the network 135) a remote server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 105 may communicate with an infrastructure element 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of elements 140.

An infrastructure element 140 is typically stationary or non-moving, i.e., fixed to, and not able to move from, a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each sensor 145 is mounted to the infrastructure element so as to have a substantially unmoving and unchanging field of view.

Sensors 145 thus provide field of views in contrast to vehicle 105 sensors 115 in a number of advantageous respects. First, because sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, sensors 145 can communicate with the element 140 computer 155 via a wired connection, whereas vehicles 105 typically can communicates with elements 140 and/or a server 170 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

The server 170 can be a conventional computing device, i.e., including one or more processors and one or more memories, programmed to provide operations such as disclosed herein. Further, the server 170 can be accessed via the network 135, e.g., the Internet or some other wide area network.

Vehicle Paths

Figure 2:
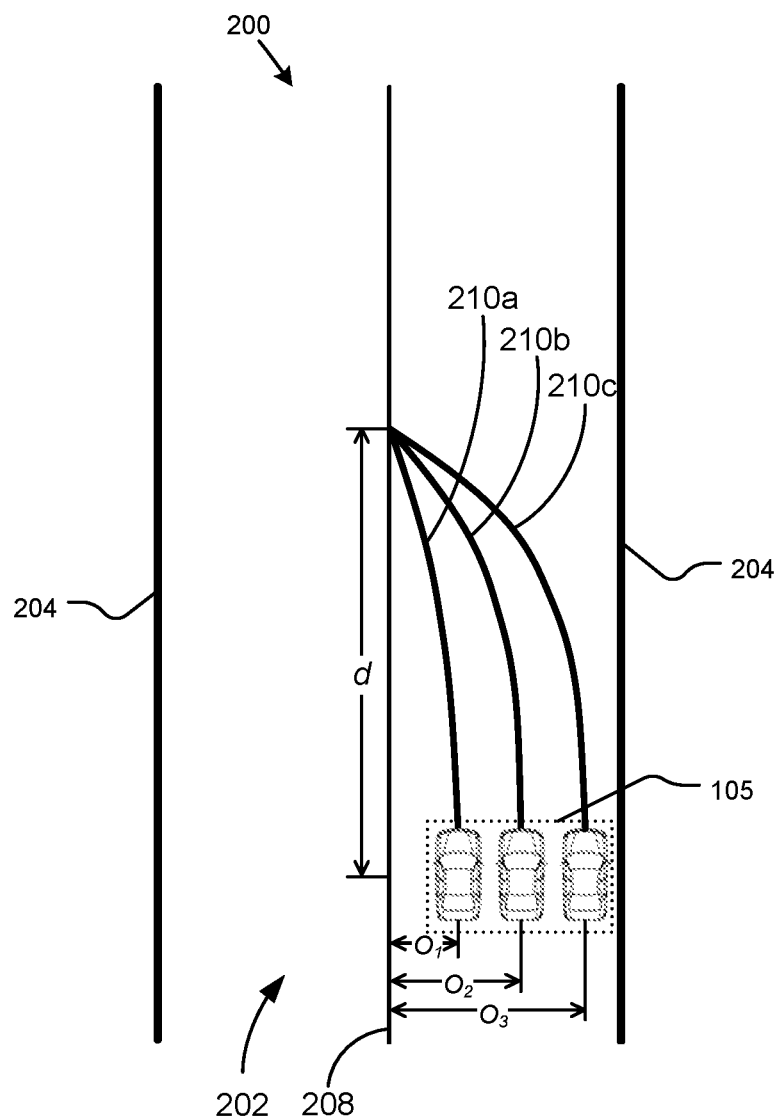
FIG. 2 illustrates an example traffic scene including a vehicle path and path polynomials.

FIG. 2 is a diagram of a traffic area 200. Traffic area 200 is an overhead view of an environment around a vehicle 105. Traffic area 200 includes three examples of locations a vehicle 105 could occupy in traffic area 200. Traffic area 200 includes a roadway 202 defined by lane markers 204. Locations of lane markers 204 with respect to a vehicle 105 can be determined by a computing device 110 in a vehicle 105 using information from vehicle sensors 115. For example, vehicle sensors 115 can include a video sensor and a lidar sensor. Information from a video sensor and/or a lidar sensor can be processed by vehicle computer 110 using machine vision techniques to determine the locations of portions of sensor data corresponding to respective lane markers 204 with respect to vehicle 105. For example, a Hough transform can identify straight dashed lines in a field of view of video data or lidar sensor reflectance data. By determining the locations of left and right lane markers 204 in a sensor 115 field of view, for example, a vehicle computer 110 can determine the location of a vehicle 105 with respect to a roadway 202.

A computing device 110 in a vehicle 105 can be programmed to acquire sensor 115 data regarding the external environment of a vehicle 105 and to use the sensor data to determine a path polynomial upon which to operate a vehicle 105 based on a planned vehicle path 208 in autonomous or semi-autonomous mode. A vehicle path is a straight or curved line that describes successive locations (i.e., locations at different times) of a vehicle on a two-dimensional (2D) plane parallel to the surface of a roadway upon which the vehicle operates. A vehicle can operate on a roadway by determining a path polynomial 210 to traverse a vehicle path 208. A path polynomial 210 can include path coefficients that determine the relationship between x, a distance measured along, and therefore parallel to, a vehicle path, and y, a distance measured lateral to, and therefore perpendicular to, a vehicle path. Based on path coefficients, a computing device can determine instructions to direct vehicle steering components by inputting path coefficients into a steering controller (e.g., electronic control unit or ECU) to operate a vehicle on a roadway. A computing device can determine a path polynomial 210 including path coefficients based on vehicle sensor data and/or vehicle path information received from an infrastructure element 140 and/or a cloud-based server computer 170 via the network 135.

Vehicle planned path 208 information can be used by computer 110 to operate vehicle 105 along the path 208 by determining real world information regarding vehicle 105 location and direction based on vehicle sensor 116 data and comparing it to vehicle path 208 data so that a path polynomial may be determined and used to operate the vehicle 105. Traffic scene 200 also includes path polynomials 210a, 210b, 210c, referred to collectively as path polynomials 210, corresponding respectively to three possible positions of vehicle 105. The computer 110 can determine a path polynomial 210 for a vehicle 105 based on the planned path 208 and the location and direction of vehicle 105 with respect to the vehicle path 208. A path polynomial 210 can be expressed as a cubic polynomial as follows:

$$y(x)=a_0+a_1x+a_2x^2+a_3x^3,$$

wherein $y(x)$ is a lateral distance between the path and a center of a vehicle 105 determined at a displacement x from the origin measured in meters. The vehicle path origin can be defined as the point on a vehicle path 208 closest and perpendicular to the center of a vehicle 105 at the time the path polynomial 210 is determined. The displacement x can be determined over a range d as illustrated in traffic scene 200. The range d determines the rate at which vehicle 105 returns from a location not on a vehicle path 208 to a location on a vehicle path 208 and can be determined based on user input and the speed of vehicle 105, for example.

Path coefficient $a_0$ is the lateral distance between the vehicle path 208 and the center of a vehicle 105 measured in meters. Three values of path coefficient $a_0$ are illustrated in FIG. 2 as lateral distances $O_1$, $O_2$, and $O_3$. Path coefficient $a_1$ is the vehicle steering path heading angle, measured in radians with a heading of zero radians equal to the direction of the vehicle path 208. Steering path heading angle is the direction of the path polynomial 210 at its origin at the center of vehicle 105 compared to the direction of the vehicle path 208. Path coefficient $a_2$ is the path polynomial 210 steering path curvature at its origin at the center of vehicle 105 and is measured in meters$^{-1}$. Path coefficient $a_3$ is the path polynomial 210 steering path curvature rate of change at its origin at the center of vehicle 105 and is measured in meters$^{-2}$. Curvature and rate of curvature change can be measured with respect to either time or distance. In examples where curvature and rate of curvature change are measured in time, vehicle 105 speed can be included in calculations to convert time to distance. In examples where curvature and rate of curvature change are measured in distance, vehicle speed 105 can be included in determining distance d. For example, d can be linearly related to vehicle 105 speed.

Computer 110 can command a steering controller to control vehicle 105 steering components 125 to operate vehicle 105 along a vehicle path 208 based on path coefficients $a_0$, $a_1$, $a_2$, and $a_3$. When vehicle 105 is operating along a vehicle path 208, path coefficients $a_0$ and $a_1$ will be zero and path coefficients $a_2$ and $a_3$ along with direction will be determined by the vehicle path 208. The real world location of vehicle 105 can be determined by computer 110 based on vehicle sensors 116 and compared to the predicted location based on path coefficients. While it is desirable that the predicted path polynomial 210 never diverges from the vehicle path 208, in reality vehicle 105 will be subject to perturbations and disturbances caused by the external environment that can affect the motion of vehicle 105 as it operates along a vehicle path 208. A computer 110 can acquire vehicle 105 location and direction information from vehicle sensors 115 including video sensors, lidar sensors, GPS sensors and inertial navigation system (INS) sensors, for example. Vehicle 105 location and direction information can be processed by computer 110 as feedback in a closed-loop control process that operates vehicle 105 along vehicle path 208. Computer 110 can determine an error signal based on an error function that determines differences between the location and direction vehicle 105 and the location and direction of vehicle path 208.

Figure 3:
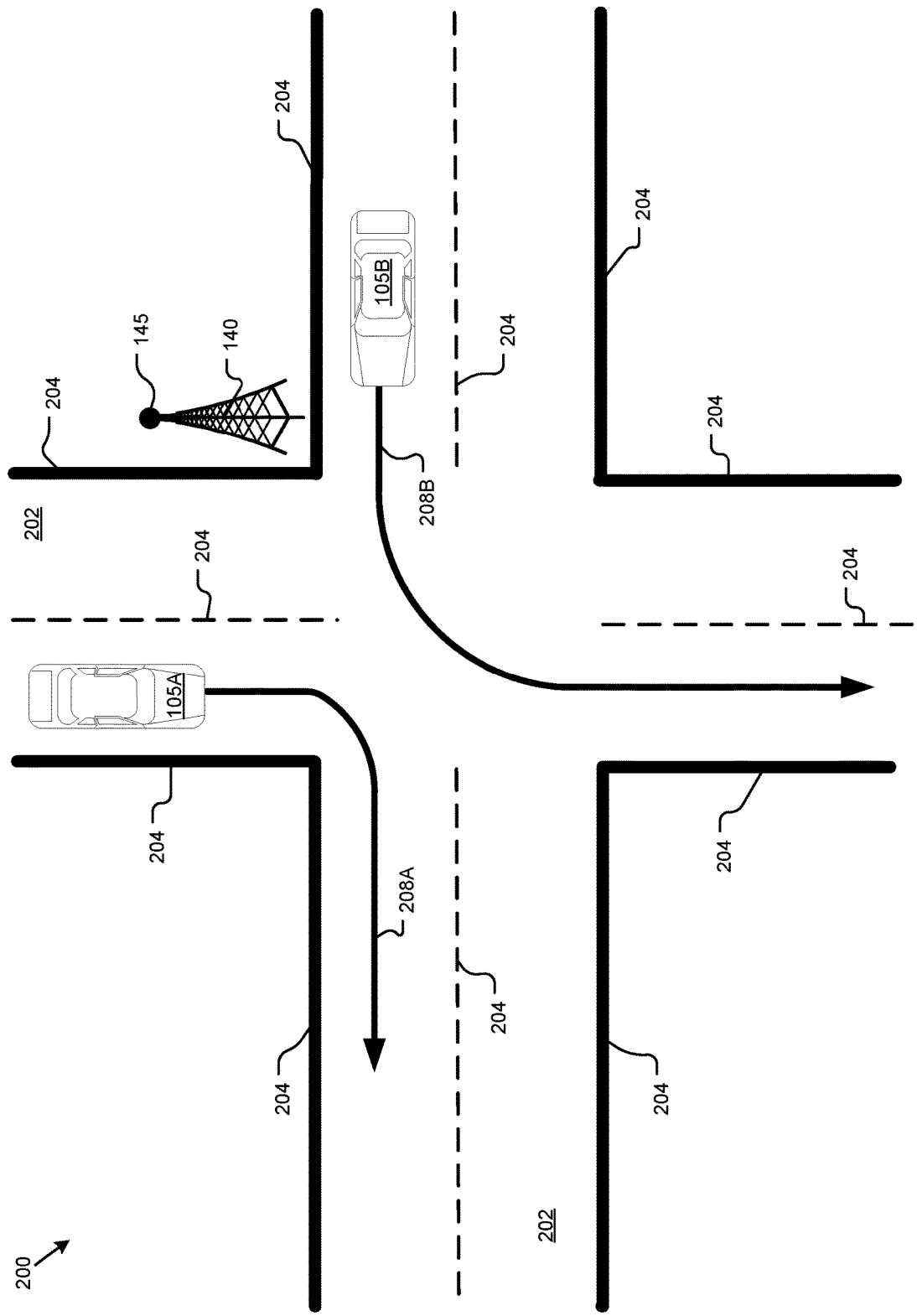
FIG. 3 is a diagram illustrating an example area proximate to an infrastructure element, including vehicles and their respective planned paths.

Turning to FIG. 3, an infrastructure element 140 can be provided to monitor a traffic area 200 around the infrastructure element 140, including vehicles 105A, 105B on road(s) 202, as well as other objects on a road 202, such as a pedestrian, a bicycle, etc. A sensor 145 mounted to the infrastructure element, e.g., a lidar, can have a field of view from which the sensor 145 can provide data about various objects, e.g., vehicles 105A, 105B, pedestrians, bicycles, etc.

The computer 155 can receive various data from the infrastructure element 140 sensors 145 to generate an area map. Such data can include lidar data from within a sensor 145 field of view that includes conventional lidar point cloud data acquired by lidar sensors 145, i.e., including data describing points in three dimensions. Various techniques are known for identifying hazards or objects and/or determining characteristics of hazards and/or objects, such as a height, a width, identification of an object (e.g., bicycle, pedestrian, speedbump, pothole, etc.), etc. A map of an area 200, or portion thereof within a sensor 115, 145 field of view can be rendered in a variety of ways. In an example used herein, the area map specifies, e.g., according to a Cartesian coordinate system or the like, e.g., global positioning system latitude and longitude coordinates, respective locations of objects such as vehicles 105, and/or other non-moving or moving objects such as rocks, bicycles, pedestrians, etc.

As illustrated in FIG. 3, respective vehicles 105A, 105B (i.e., respective computers 110 in the vehicles 105A, 105B) have determined respective planned paths 208A, 208B. Via a communications module 130, a vehicle computer 110 can provide a planned path 208 to an infrastructure element 140 and/or other vehicles 105. As mentioned above, due to various perturbations, and precision in actuation of components 125, imprecision in sensors 115, etc., a planned path 208 represents an ideal or goal that a vehicle 105 will not precisely or perfectly execute in reality. The planned path 208 thus represents a path that the vehicle computer 110 attempts to execute by implementing a path polynomial 210, as described above. The vehicle computer 110 implements the path polynomial by relying on a perception subsystem, i.e., sensors 115 that provide data to a localization routine, e.g., to perform what is known as simultaneous localization and mapping (SLAM).

Assuming that no faults are detected with a vehicle 105 perception subsystem, i.e., sensors 115 and/or localization routines, i.e., algorithms in the computer 110 that interpret sensor 115 data to generate a path polynomial 210, the computer 110 provides instructions to actuators 120 to actuate components 125 according to a determined path polynomial 210, but may not be able to determine if actuators 120 and/or components 125 operate as expected, i.e., perform steering, braking, acceleration, etc., as determined by the computer 110 to implement the path polynomial 210 according to a planned path 208. That is, performing a SLAM routine may allow a vehicle computer 110 to determine a vehicle 105 locations at respective times in an area 200, but may not allow the vehicle computer 110 to determine that the locations are deviating from a planned path 208 due to faults or failures in actuators 120 and/or components 125. Advantageously, as disclosed herein, an infrastructure element 140, possibly in concert with one or more second vehicles 105, can determine if a first vehicle 105 is substantially deviating from a planned path 208, i.e., is deviating from the planned path 208 in a manner that likely indicates a fault or defect with actuators 120 and/or components 125. For example, if vehicle 105 actuators 120 and/or components 125 are subject to sabotage such as a cyber attack to alter programming of an actuator 120 and/or component 125, a vehicle 105 computer 110, where a perception subsystem is reporting healthy operation, may be slow or unable to detect faulty vehicle 105 operation, whereas systems and methods disclosed herein can provide for quick and effective detection.

Figure 4:
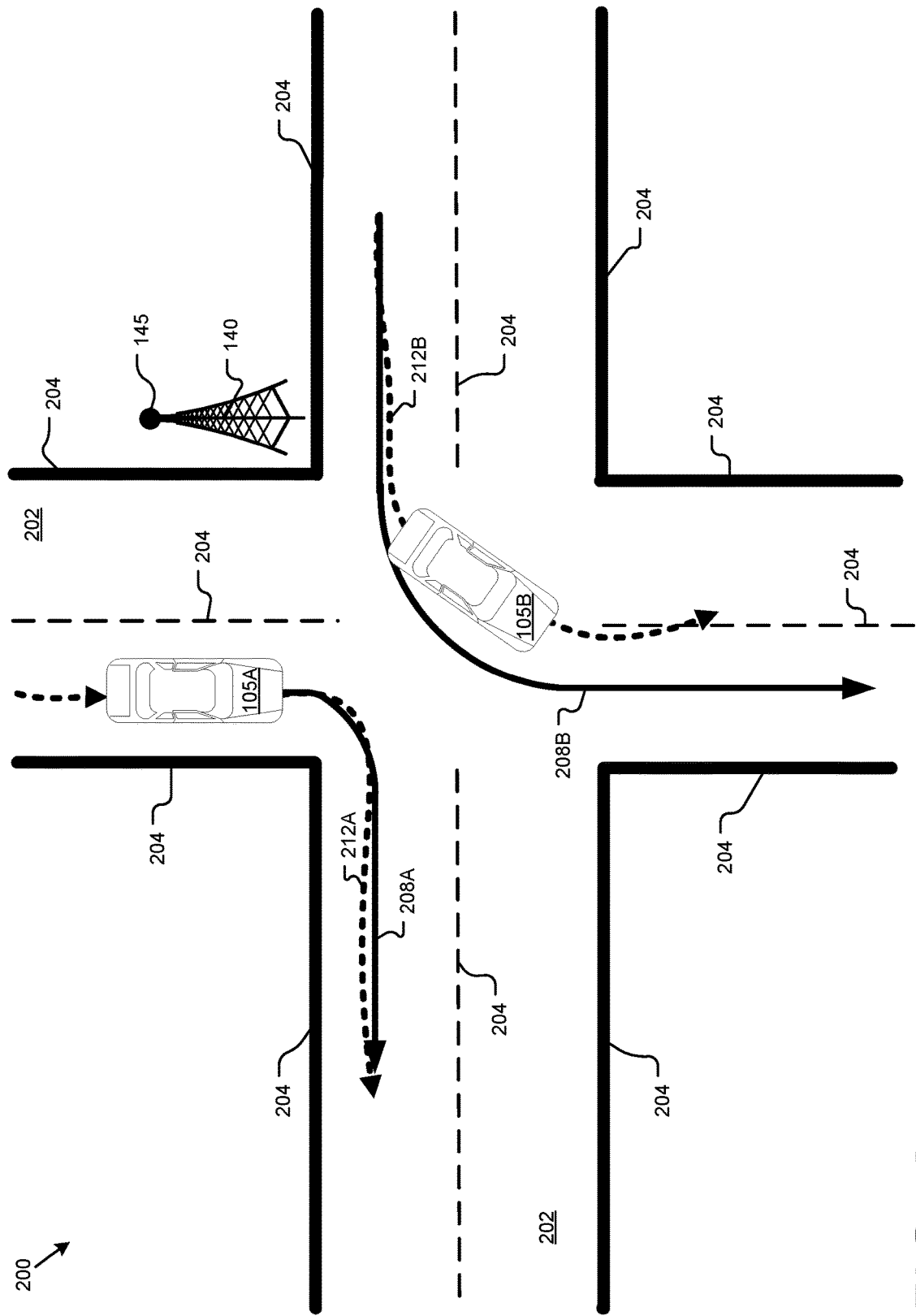
FIG. 4 is a further diagram of the example area proximate to an infrastructure element, including vehicles and their respective planned and actual paths.

FIG. 4 illustrates that actual paths 212A, 212B (sometimes referred to as ground truth paths 212) of the vehicles 105A, 105B typically do not precisely match or follow the planned paths 208A, 208B. FIG. 4 is intended to illustrate that, for the vehicle 105A, the actual path 212A is relatively close to the planned path 208A. On the other hand, the actual path 212B of the vehicle 105B deviates significantly, and in a manner that poses a safety risk, from the planned path 208B.

Figure 5:
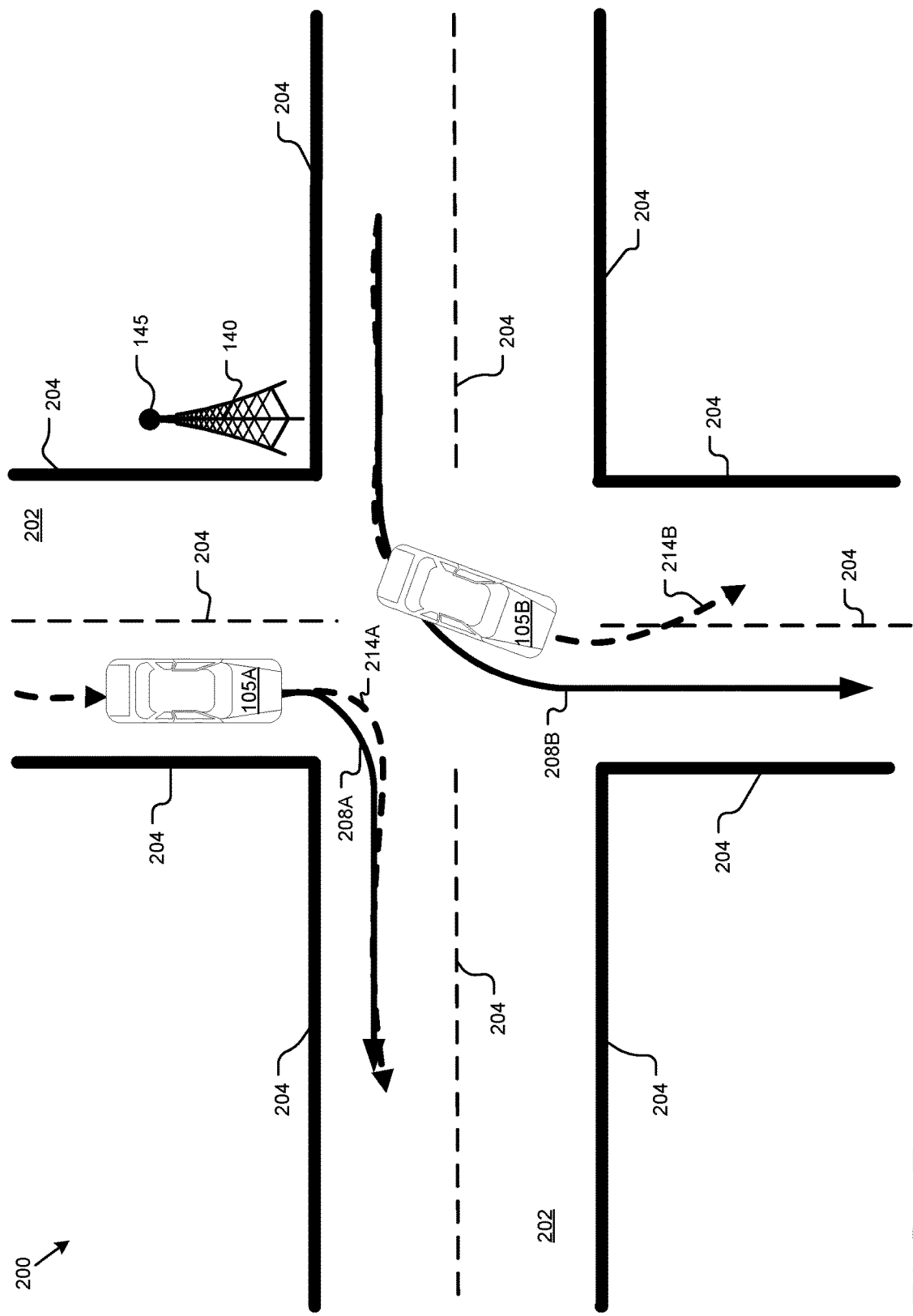
FIG. 5 is a further diagram of the example area proximate to an infrastructure element, including vehicles and their respective planned and detected paths.
Figure 6:
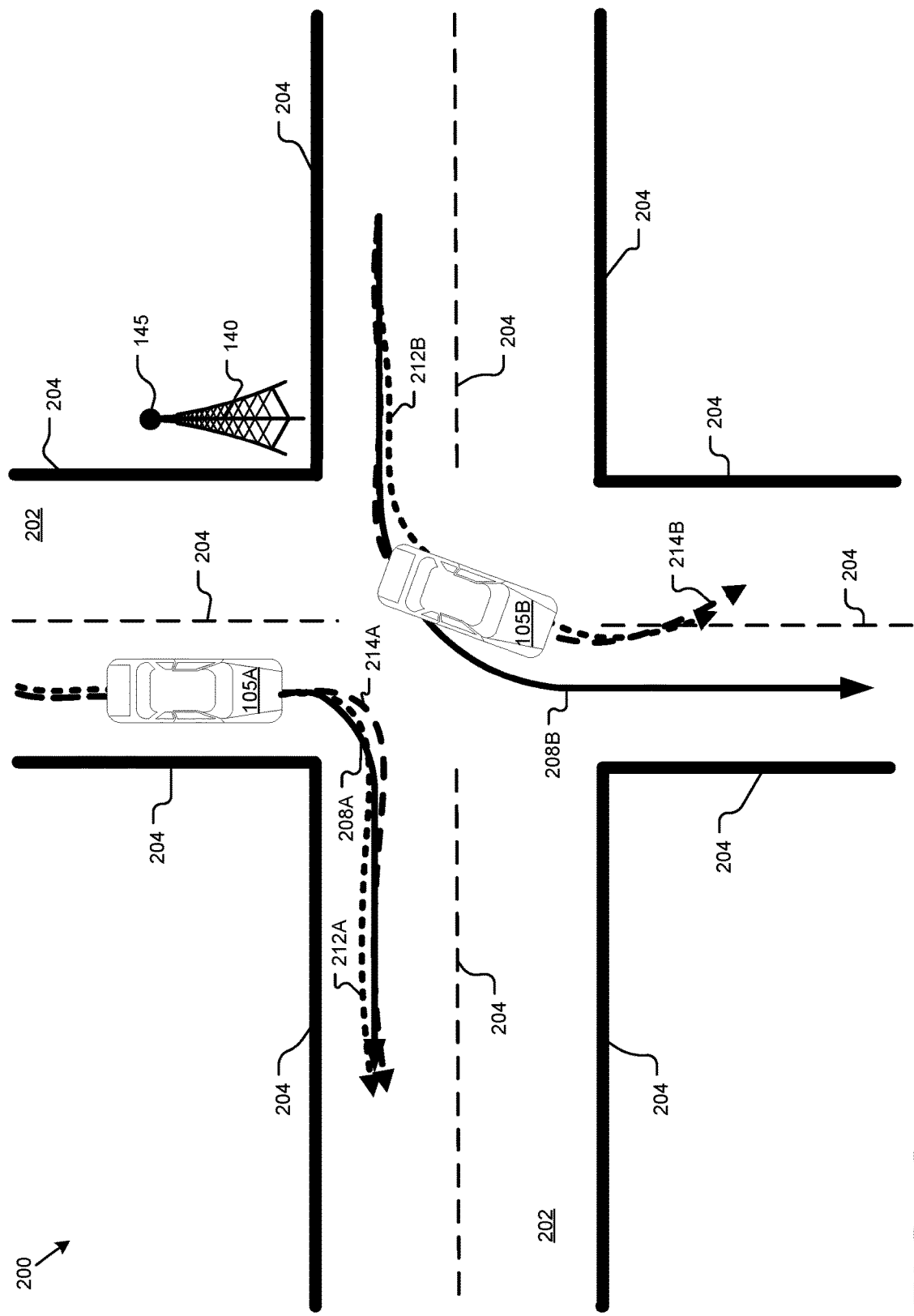
FIG. 6 is a further diagram of the example area proximate to an infrastructure element, including vehicles and their respective planned, actual, and detected paths.

As seen in FIG. 5, an infrastructure node 140, based on data from one or more infrastructure sensors 145, can determine detected paths 214A, 214B for vehicles 105A, 105B in an area 200. FIG. 6 illustrates the area 200 including representations of actual paths 212 and detected paths 214 along with the planned paths 208. Detected paths 214 are typically approximations or imprecise representations of actual paths 212, i.e., due to imprecision in obtaining and analyzing data from sensors 115, 145, etc., detected paths 214 typically do not precisely or perfectly represent, but may be close to, ground truth, i.e., actual paths 212. Further, actual paths 212 and detected paths 214 can be close not only to each other, but to a planned path 208, as seen with respect to the paths 208A, 212A, and 214A of the vehicle 105A. However, the actual path 212B and the detected path 214B of the vehicle 105B deviate substantially from the planned path 208B.

Processing

Figure 7:
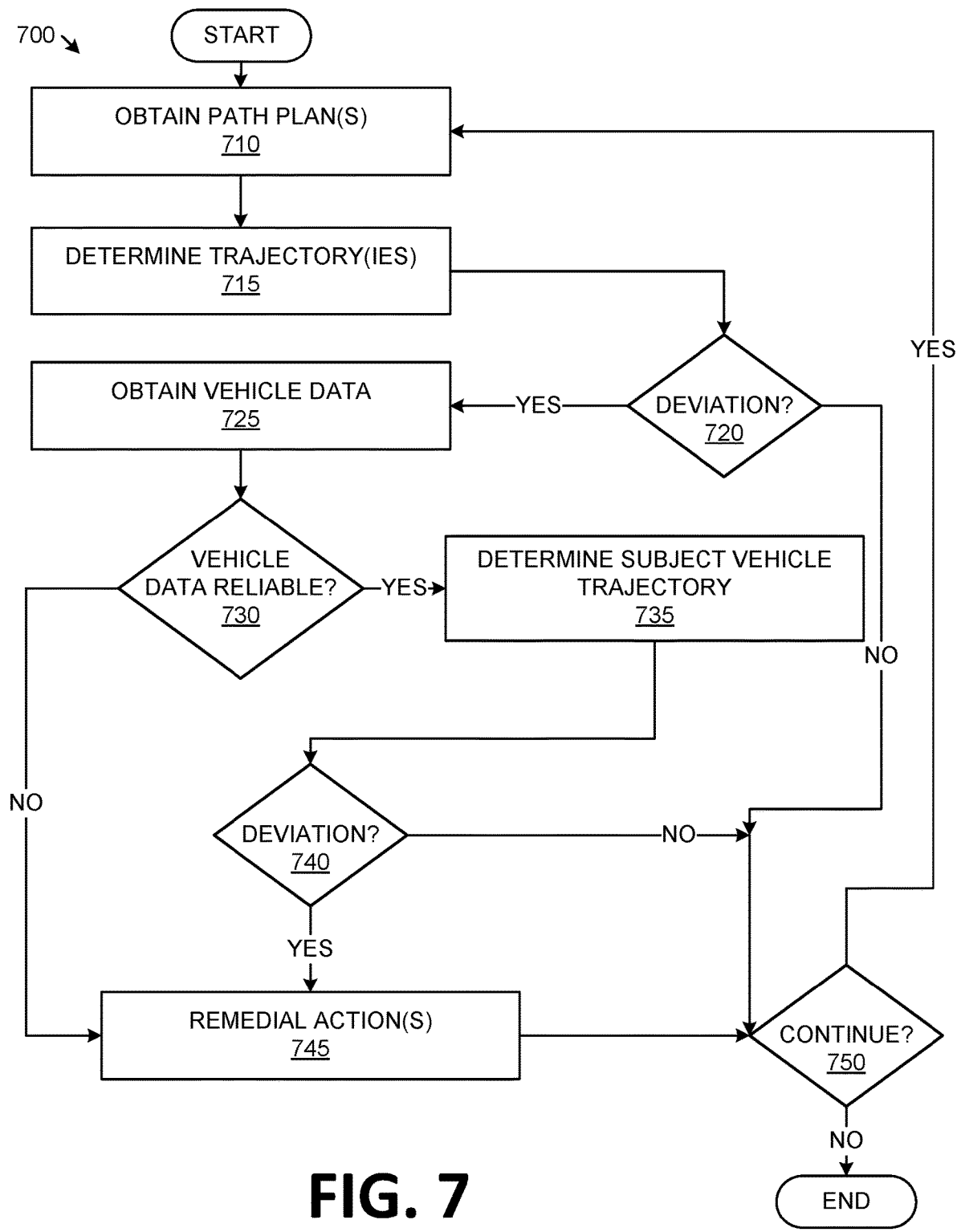
FIG. 7 is a flowchart of an exemplary process for determining whether a vehicle has a possible fault in executing a planned path.

FIG. 7 is a flowchart of an exemplary process 700 for determining whether a vehicle has a possible fault in executing a planned path. The process 700 may be executed in a computer 155 of an infrastructure element 140.

The process 700 begins in a block 710, in which the computer 155 receives respective path plans 208 from one or more vehicles 105 in an area 200 within a field of view of infrastructure element 140 sensors 145. Communications modules 130, 150 can engage in V2X communications as discussed above.

The path plans 208 can be provided as a time series of vehicle 105 data of locations and velocities, and typically also headings and possibly accelerations. That is, for each time $t_k$ in a set of times $t_0 \ldots t_n$ beginning at the time to and ending at the time $t_n$ vehicle 105 data such as location, velocity, heading, acceleration, etc., can be provided, along with an identifier for the respective vehicle 105. A time T defined by a duration from $t_0 \ldots t_n$ can be, e.g., three seconds. Each of the times $t_k$ is typically equally temporally spaced from one another. Further, the number n of times $t_k$ can be determined according to bandwidth constraints or the like, balanced against a requirement to have data of sufficiently high resolution to monitor a vehicle 105. Thus, in one example, the time T could be three seconds, n could be 30, whereupon the temporal space, i.e., amount of time, between each of the times $t_k$ would be 100 milliseconds (ms). Locations could be provided in a path plan 208 as a set of geo-coordinates, e.g., global geo-coordinates such as may be used by a Global Positioning System.

Following the block 710, or possibly substantially contemporaneously with the block 705, in a block 715, the computer 155, based on data from sensors 145, determines a trajectory at each of the times $t_k$ for each of the vehicles 105 for which a planned path was received in the block 705. A trajectory of a vehicle 105 describes its location, heading and velocity, and often also its acceleration, at a series of times, e.g., the series $t_0 \ldots t_n$. Note that the computer 155 could determine respective trajectories for each of a plurality of vehicles 105 in an area 200. However, for ease of description, this discussion of the process 700 includes the computer 155 determining a trajectory for a subject vehicle 105B, but it should be understood that the process 700 could be executed to substantially contemporaneously evaluate respective trajectories of a plurality of vehicles 105.

Next, in a block 720, the computer 155 determines whether a trajectory of a subject vehicle 105B, as determined based on sensor 145 data, differs by more than a specified threshold from a trajectory specified in the planned path 208 for the vehicle 105B. Further, the computer 155 determines whether the subject vehicle 105B has reported a healthy status of its perception subsystem, i.e., sensors 115 and/or localization routines. The specified threshold may be a lateral distance of a location of the vehicle 105B on a detected path 214B from a location of the vehicle 105 be on a planned path 208B. A lateral distance, consistent with the above description, means a distance from a planned path 208B measured by a length of a line from the path 208B at a specified location for a time $t_1$ to a location of the vehicle 105B on a detected path 214B at the time $t_1$, the line being perpendicular to the path 208B (or perpendicular to a tangent of the path 208B) at the specified location on the path 208B. The threshold distance can be a function of other factors, such as a vehicle 105 velocity and/or heading, and further could be empirically determined for different makes and models of vehicles, e.g., the threshold distance might be different for a large SUV as opposed to a compact sedan. Thus, the computer 155 could store, e.g., in a lookup table or the like, associated vehicle makes and models, and possibly various velocities, for example, for respective threshold distances based on empirical determination and/or manufacturer specification.

If the computer 155 determines that the subject vehicle 105B deviates from a planned path 208B by more than the threshold amount, then a block 725 is executed next. Otherwise, the process 700 proceeds to a block 750.

In the block 725, some or all of which may be executed before, after, or contemporaneously with the block 720, the computer 155 obtains, via V2X communications as mentioned above, trajectory data about the subject vehicle 105B in an area 200 from one or more other respective vehicles 105 in the area 200 for the times $t_0 \ldots t_n$. That is, a vehicle 105 computer 110 can, based on sensor 115 data, determine a trajectory of various sensed objects within sensor 115 fields of view, such as other vehicles 105. That determined trajectory, e.g., at times $t_k$, can then be provided to the infrastructure element 140. Data provided to the infrastructure element 140 from one or more respective vehicles 105 in the block 725 can further include a report specifying a health status of the sensors 115 of the vehicle 105, e.g., a binary value indicating that sensors 115 are healthy or not healthy, and/or an indication of a detected fault or faults, if any. The block 725 could be omitted in some implementations, or could be skipped in some executions of the process 700, e.g., if only one vehicle 105 is present in an area 200.

Next, in a block 730, the computer 155 determines whether at least some of the vehicle 105 data received in the block 720 is based on reliable sensor 115 perceptions, i.e., can be used reliably to determine a trajectory of a subject vehicle 105B. If no vehicle 105 data received in the block 725 is deemed reliable, then the process 700 proceeds to a block 750 from the block 730. Otherwise, the process 700 proceeds to a block 735.

In the block 735, the computer 155 determines a location at times $t_0 \ldots t_n$ for a subject vehicle 105 based on a trajectory determined as described above based on infrastructure sensor 145 data as well as trajectories provided by one or more vehicles 105 in the area 200. For example, a location could be taken as an average of a location specified by respective trajectories determined by computers 110, 155. In another approach, the computer 155 could subdivide the area 200 into a grid, e.g., each square on the grid representing a square meter, and the computer 155 could then specify a square in the grid occupied by a vehicle 105.

In the block 740, following the block 735, the computer 155 determines whether the subject vehicle 105B deviates from a planned path 208B by more than the threshold distance based on a location determined in the block 735. Alternatively, to determine whether a vehicle 105B location deviates from a planned path 208B, the computer 155 could determine whether a vehicle location is in a square of a grid at a time is different than a specified square of the grid at any time $t_k$. That is, the threshold could simply be a binary value, e.g., a zero specifying that a vehicle 105 is not in a specified square of a map grid. If the threshold for determining deviation from a planned path 208 is met, then a block 745 is executed next; otherwise, the process 700 proceeds to the block 750.

In the block 745, the computer 155, having determined that a vehicle 105B detected path 214B deviates from a planned path 208B, meaning that the vehicle 105B may have an undetected fault in one or more actuators 120 or components 125, takes a remedial action. For example, the computer 155 could send a message to the vehicle 105B specifying the likely fault and/or commanding the vehicle 105B to come to a stop. The process 700 proceeds to the block 750 from the block 745.

In the block 750, the computer 155 determines whether the process 700 is to continue. For example, the process 700 could run continuously or substantially continuously, and be terminated only when an infrastructure element 140 was powered down. Alternatively, the process 700 could and when it is determined that no vehicles 105 are present in an area 200, and could then be reinitiated upon detecting one or more vehicles 105. In any event, if the process 700 is to continue, the process 700 returns to the block 705. Otherwise, the process 700 and following the block 750.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on."

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
receive from a vehicle a planned path that the vehicle currently intends to follow and a status of one or more sensors in the vehicle; and
initiate a remedial action upon determining that the status of the one or more sensors includes an indication that no fault is detected and the planned path deviates by more than a threshold from a detected path that the vehicle is currently detected to be following.

2. The system of claim 1, wherein the remedial action includes a command to the vehicle to stop.

3. The system of claim 1, wherein the instructions further include instructions to determine the detected path based on data from an infrastructure sensor and data provided by a second vehicle.

4. The system of claim 1, wherein the threshold is a distance.

5. The system of claim 4, wherein the distance is dependent on velocity.

6. The system of claim 1, wherein the threshold is an absence of the vehicle from a square in a grid that includes the planned path.

7. The system of claim 1, wherein the instructions further include instructions to determine the detected path based on data collected by a sensor at a first time and data collected by the sensor at a second time.

8. The system of claim 1, wherein the instructions further include instructions to determine that the planned path deviates by more than the threshold from the detected path based on data from a second vehicle and data from a non-moving infrastructure element.

9. The system of claim 1, further comprising a non-moving infrastructure element, wherein the computer is mounted to the infrastructure element.

10. A method, comprising:
receiving from a vehicle a planned path that the vehicle currently intends to follow and a status of one or more sensors in the vehicle; and
initiating a remedial action upon determining that the status of the one or more sensors includes an indication that no fault is detected and the planned path deviates by more than a threshold from a detected path that the vehicle is currently detected to be following.

11. The method of claim 10, wherein the remedial action includes a command to the vehicle to stop.

12. The method of claim 10, further comprising determining the detected path based on data from an infrastructure sensor and data provided by a second vehicle.

13. The method of claim 10, wherein the threshold is a distance.

14. The method of claim 13, wherein the distance is dependent on velocity.

15. The method of claim 10, wherein the threshold is an absence of the vehicle from a square in a grid that includes the planned path.

16. The method of claim 10, further comprising determining the detected path based on data collected by a sensor at a first time and data collected by the sensor at a second time.

17. The method of claim 10, further comprising determining that the planned path deviates by more than the threshold from the detected path based on data from a second vehicle and data from a non-moving infrastructure element.

18. The method of claim 10, wherein the method is executed by, according to instructions stored in, a computer mounted to an infrastructure element.

* * * * *